US012656140B2

(12) United States Patent
McClelland et al.

(10) Patent No.: US 12,656,140 B2
(45) Date of Patent: Jun. 16, 2026

(54) DISTRIBUTED VEHICLE ROUTE PLANNING

(71) Applicant: Zoox, Inc., Foster City, CA (US)

(72) Inventors: Mark Jonathon McClelland, San Francisco, CA (US); Christopher James Gibson, Belmont, CA (US); Swapnil Vikas Mankar, Union City, CA (US); Zhichun Feng, Foster City, CA (US); Igor Podkhodov, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 253 days.

(21) Appl. No.: 18/478,698

(22) Filed: Sep. 29, 2023

(65) Prior Publication Data

US 2025/0109956 A1 Apr. 3, 2025

(51) Int. Cl.
*G01C 21/34* (2006.01)
*G01C 21/36* (2006.01)

(52) U.S. Cl.
CPC ..... *G01C 21/3492* (2013.01); *G01C 21/3691* (2013.01)

(58) Field of Classification Search
CPC .......................... G01C 21/3492; G01C 21/3691
See application file for complete search history.

(56) References Cited

U.S. PATENT DOCUMENTS

| 2015/0185037 A1 | 7/2015 | Horvitz |
| 2022/0042812 A1* | 2/2022 | Chan ................ G08G 1/096805 |

FOREIGN PATENT DOCUMENTS

| CN | 103245347 | A | 8/2013 |
| KR | 20140033615 | A | 3/2014 |
| KR | 20150050932 | A | 5/2015 |
| KR | 20170038480 | A | 4/2017 |

OTHER PUBLICATIONS

Search Report and Written Opinon for International Application No. PCT/US2024/048300, Dated Jan. 6, 2025, 11 pages.

* cited by examiner

*Primary Examiner* — Vivek D Koppikar
(74) *Attorney, Agent, or Firm* — Lee & Hayes, P.C.

(57) ABSTRACT

The techniques described herein relate to controlling and/or influencing the routes driven by vehicles, autonomous or otherwise, such as vehicles in a fleet of vehicles managed by a fleet management system. In some cases, the techniques described herein relate to centrally generating road weights using a remote system such as a fleet management system and providing those pre-calculated weights to vehicles to simplify onboard route planning. Rather than transmitting large amounts of raw traffic, road condition, and other data to each vehicle, the remote system pre-processes the data into condensed road weights optimized for route planning. This architecture provides various technical advantages such as reduced data transmission, decreased computational load on vehicles, and decentralized control of fleet-wide routing.

19 Claims, 5 Drawing Sheets

400 ⟍

300 ⟍

RECEIVE TRAFFIC DATA
302

RECEIVE ROAD STATUS DATA
304

DETERMINE AN EXPECTED TRAVEL TIME FOR A ROAD
306

DETERMINE A WEIGHT FOR THE ROAD
308

PROVIDE THE WEIGHT TO A VEHICLE COMPUTING DEVICE
310

400

DISTRIBUTED VEHICLE ROUTE PLANNING

BACKGROUND

Vehicles, autonomous or otherwise, may utilize route planning techniques to determine driving routes from their current locations to desired destinations in an environment. For fleets of associated vehicles, such route planning techniques may be performed independently by the vehicles themselves and/or by off-vehicle fleet routing services configured to determine and provide driving routes to the vehicles in the fleet. In either case, determining safe and efficient driving routes for vehicles to reach their destinations may present challenges, especially when navigating the vehicles through complex, congested, and dynamic driving environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
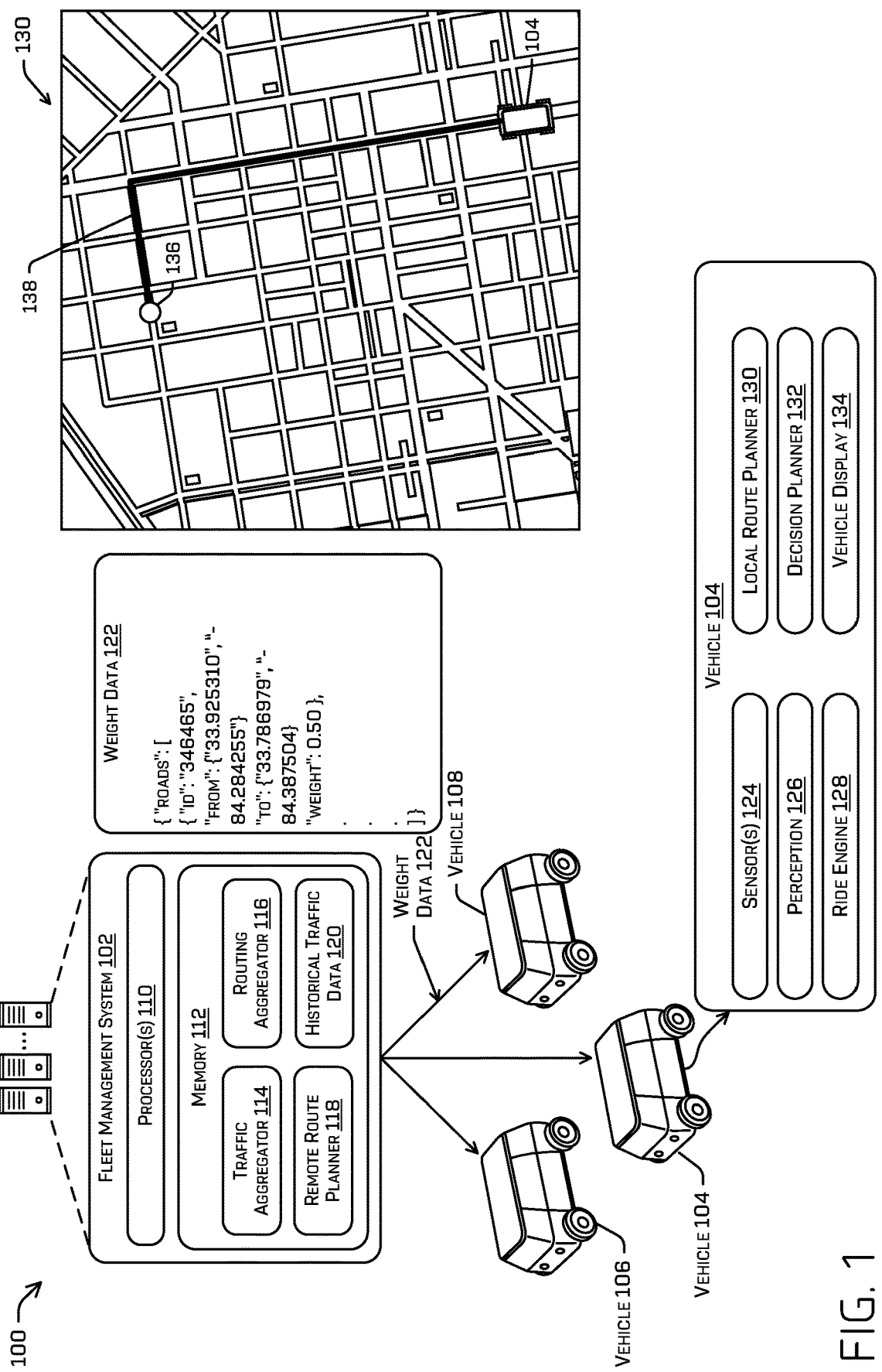
FIG. 1 depicts an example environment that may be used for routing a fleet of vehicles to perform various driving trips in an environment.

The techniques described herein relate to controlling and/or influencing the routes driven by vehicles, autonomous or otherwise, such as vehicles in a fleet of vehicles managed by a fleet management system. In some cases, the techniques described herein relate to centrally generating road weights using a remote system such as a fleet management system and providing those pre-calculated weights to vehicles to simplify onboard route planning. Rather than transmitting large amounts of raw traffic, road condition, and other data to each vehicle, the remote system pre-processes the data into condensed road weights optimized for route planning. This architecture provides various technical advantages such as reduced data transmission, decreased computational load on vehicles, and centralized control of fleet-wide routing. Such decentralized control may, for example, provide flexibility to vehicles within the fleet by allowing the vehicles to deviate from otherwise prescribed routes in the event that some other or unknown event impacts travel of the vehicle. The generated road weights may reflect expected travel times on each road as determined based on factors like traffic and/or road status.

In some cases, the techniques described herein include generating weights for roads (e.g., for road segments) by a remote system. The remote system may be a system that is remote from a vehicle and/or a vehicle computing device, such that the remote system interacts with the vehicle and/or the vehicle computing device using a network. In some cases, the remote system is a cloud computing platform, such as a cloud computing platform that executes software associated with a fleet management system. In some cases, the remote system includes a fleet management system.

In some cases, the remote system generates a road's weight based on at least one of traffic data associated with the road, road status data associated with the road (e.g., is the road open or closed, what is the current traffic direction or speed limit associated with the portion of the road, and the like), and fleet density data associated with the road. In some cases, the road's weight represents, or is indirectly related to, at least in part an expected travel time associated with the road. Accordingly, the remote system may use at least one of traffic data, road status data, or fleet density data to make inferences about expected travel times on different roads. The remote system may then use the travel time inferences to determine weights associated with the roads.

For example, in some cases, the remote system determines an expected travel time associated with a road based at least in part on historical traffic data associated with the road. Historical travel data may represent expected travel times for different times of day and/or days of the week based on actual, measured travel times for vehicles during one or more previous time periods. For example, historical travel data may represent that rush-hour traffic is expected to add twenty minutes to expected travel time for a particular road. As highlighted in this example, weights may vary temporally such that a road weight for a same portion of a road may differ over the period of a day, with respect to different days of the week, times of the year, etc.

As another example, in some cases, the remote system determines an expected travel time associated with a road based at least in part on real-time traffic data associated with the road and/or with the environment of the road. Real-time traffic data may be determined based on data received from traffic speed databases, observed transit times for the fleet of vehicles, commercial traffic monitors, and/or traffic reports. Real-time traffic data may include real-time or recent-in-time data of vehicles in the fleet of vehicles, and/or mobile device movement data of mobile devices on the road. In some cases, real-time traffic data may represent current speeds associated with vehicles traversing a road. Such real-time traffic data may represent that a road is abnormally congested and thus be used to adjust the expected travel time associated with the road. As used herein, the term real-time includes data that describes current traffic conditions but does not necessarily imply immediacy or moment-to-moment accuracy. Accordingly, should be understood that "real-time" may encompass a range of temporal resolutions, from data that is virtually instantaneous to data that may be hours old but still describes current, as opposed to historical, traffic conditions. In some cases, real-time traffic data includes recent (e.g., within a threshold period of time such as within 1 minute, 10 minutes, 30 minutes, 1 hour, etc.) or near-real-time traffic data.

As a further example, in some cases, the remote system may determine an expected travel time associated with a road based at least in part on road status data associated with a road. Road status data may represent temporary modifications to a road network. In some cases, road status data may represent reduced lanes (e.g., due to lane closures), modified traffic flows, detour requirements, road closures, traffic light failures, and/or the like. The remote system may use such data to adjust expected travel times. For example, if a road is closed, then the remote system may set the expected travel time associated with the road to a large value (e.g., up to and including positive infinity). As another example, if a road is experiencing a lane closure, the remote system may increase the expected travel time associated with the road based on an expected congestion level associated with the lane closure. In some cases, the remote system may determine an expected travel time associated with a road based on both traffic data and road status data. For example, during a low-traffic period, a lane closure may not increase the expected travel time associated with the corresponding road or may increase the expected travel time by a smaller amount than an increase associated with a high-traffic period.

As an additional example, in some cases, the remote system may determine an expected travel time associated with a road based at least in part on fleet density data associated with the road. In some cases, the remote system is configured to receive data from and/or manage a fleet of vehicles (e.g., a fleet of autonomous, semi-autonomous, and/or manual vehicles). In some cases, the remote system uses the fleet density data to make inferences about traffic conditions and/or road congestion conditions. Such inferences may then be used to determine expected travel times. For example, the system may use data representing high concentration of fleets in an area to infer that the area is experiencing proportionally more overall traffic. In some cases, the remote system may use fleet density data to infer a travel speed and/or a congestion level associated with a road and use such an inference to determine the expected travel time associated with the road.

In some cases, the techniques described herein include determining a weight associated with a road based at least in part on traffic data associated with the road. Traffic data may include historical traffic data and/or real-time traffic data. In some cases, traffic data is determined based on sensor data captured by and/or provided by one or more vehicles, such as based on image data captured by and/or provided by one or more vehicles. In some cases, vehicles may provide traffic-related sensor data from onboard sensors like cameras. For example, images of roads surrounding a vehicle may be processed to estimate density of traffic on those roads. In some cases, traffic data is determined based on fleet density data, such as data describing high fleet density on a road and/or on an area that includes the road. In some cases, if traffic data represents high congestion on a road, the weight associated with that road may be decreased accordingly.

In some cases, the techniques described herein include determining a weight associated with a road based at least in part on road status data associated with the road. For example, if the road status data represents that a road is closed, then the weight for that road may be set to zero. As another example, if the road status data represents that a road is experiencing a lane closure, the weight for that road may be decreased based on an expected congestion of the road resulting from the lane closure. In some cases, the system may determine a road's weight based on both traffic data and road status data. For example, during a low-traffic time, a lane closure may have a lower effect on a road's weight relative to the effect of a lane closure during a high-traffic time.

In some cases, the techniques described herein include determining a weight associated with a road based at least in part on fleet density data associated with the road. For example, in some cases, the system may use fleet density data to make congestion-related inferences and use such inferences to determine road weights. In some cases, if fleet density data indicates that a road is experiencing high congestion, then the system may lower the road's weight proportional to the indicated congestion level. In some cases, roads that have a high concentration of the fleet's vehicles may be assumed to have proportionally more traffic. In some cases, the system may use fleet density data to distribute different vehicles of a fleet in a balanced way. For example, if the system detects that eighty percent of fleet vehicles take a first highway and twenty percent a second highway, the system may increase the weights associated with the second highway to balance traffic across both highways.

In some cases, the techniques described herein include determining a weight associated with a road based at least in part on road surface quality data associated with the road. For example, road surface quality data may indicate factors like bumpiness, cleanliness, and/or surface friction. Poor road surface quality may necessitate lower vehicle speeds and result in increased travel time on a road. Therefore, the system may process road surface quality when determining weights, for example so that roads with lower surface quality may be assigned lower weights to account for longer expected travel times resulting from vehicles slowing down on those road surfaces.

In some cases, the techniques described herein include determining a weight associated with a road based at least in part on weather data associated with the road. For example, the system may process current and/or forecasted weather data for the region encompassing the road, such as precipitation, temperature, wind, visibility conditions, and/or the like. Certain weather conditions may necessitate slower speeds, greater caution, or even avoidance of certain roads. For example, heavy rain or snow may dramatically increase expected travel times on a road. Therefore, by factoring real-time and predicted weather into the road weight calculations, the generated weights may more accurately reflect weather-adjusted travel times. This allows the route planning to account for adverse weather and reroute vehicles away from roads that are estimated to be impacted most heavily during the trip timeframe. The weather data may come from public application programming interfaces (APIs) of weather data providers, vehicle sensor data, proprietary weather models, and/or the like.

In some cases, the techniques described herein include providing road weights computed by a remote device (e.g., a remote fleet management system, such as a cloud-based fleet management system) to vehicle computing devices. In some cases, instead of sending input data used to compute road weights (e.g., traffic data, road status data, and/or fleet density data) to a vehicle computing device, the remote system transmits road weights. This both reduces the size of the data that needs to be transferred from the remote system to the vehicle computing device and decreases the computational load on the vehicle computing device, as the vehicle computing device does not need to process input data and may use the road weights provided by the remote system to perform route planning and/or compute an estimated time of arrival (ETA). In some cases, because the vehicle computing device may perform route planning and/or compute an ETA by solving a graph problem based on the road weights provided by the remote system (e.g., a graph problem in which the roads correspond to edges and road weights correspond to edge weights), the computational load on the vehicle computing device is greatly reduced.

In some cases, the remote system provides the same road weight associated with a road to all vehicle computing devices that receive weight data associated with the road. In some other cases, the remote system provides different road weights associated with a road to different computing devices that receive weight data associated with the road. For example, given a first weight computed for a road, the remote system may provide a second weight for the road to a first vehicle computing device and a third weight for the road to a second vehicle computing device. The second and third weights may be determined by adjusting the first weight by a first amount and a second amount, respectively, where the first and second amounts may be randomly selected from a predefined range. In some cases, an objective behind providing different weights for the same road to different vehicle computing devices may be to enhance fleet diversity, such that different vehicles in a fleet perform route planning using different sets of weights. Fleet diversity may be desirable because it may prevent congestion, ensure efficient resource utilization, make the fleet more robust against unreliable data scenarios (e.g., in which traffic data and/or road status data do not represent real-world conditions), and enhance overall fleet performance. By distributing vehicles using differentiated weights, the system may ensure that not all vehicles choose the same path simultaneously, which may help in avoiding potential bottlenecks or overloading of a specific route. Furthermore, fleet diversity may be an effective strategy for testing and comparing different route optimizations in real-world conditions, for example to obtain data to improve the system's routing algorithms. Additionally, by diversifying routes, there's a higher likelihood that at least a subset of the fleet will always be on the most efficient path, even if unforeseen conditions, unreliable data scenarios, and/or unexpected obstacles emerge.

In some cases, the remote system periodically recomputes a road weight associated with a road that may be relevant to a route planning task performed by a vehicle computing device and transmits the recomputed road weight to the vehicle computing device. In some cases, based on (e.g., in response to) receiving new input data (e.g., new traffic data, new road status data, and/or new fleet density data), the remote system recomputes a road weight associated with a road that may be relevant to a route planning task performed by a vehicle computing device and transmits the recomputed road weight to the vehicle computing device. In some cases, based on (e.g., in response to) receiving a new vehicle location, the remote system recomputes a road weight associated with a road that may be relevant to a route planning task performed by a vehicle computing device and transmits the recomputed road weight to the vehicle computing device.

In some cases, to further reduce the amount of data transmitted by a remote system to a vehicle computing device, the remote system does not transmit a road weight associated with a road to a vehicle computing device if the remote system has previously transmitted the same road weight associated with the same road to the vehicle computing device. In some cases, after initially sending a set of road weights for a set of roads that are determined to be relevant to a route planning task performed by a vehicle computing device, the remote system only transmits new weight data if recomputing road weights generates a modified road weight or a road weight for a new road that is newly determined to be relevant to the route planning task. Accordingly, in some cases, after the initial road weight, the road weight data transmitted by a remote system excludes already-sent road weights, thus reducing the amount of data transmitted by the remote system to the vehicle computing device. A route planning task may be characterized by a destination location, such as a destination location provided by a user using a fleet management application operating on the user's device.

In some cases, the remote system sends road weights for a set of roads that are determined to be within a region that is relevant to a route planning task. For example, the set of roads may be determined by identifying a geographic area or radius around the current location of the vehicle and/or the destination location. The defined region may also be dynamically adjusted based on real-time factors like changes in the vehicle's direction, updated destination, and/or unexpected roadblocks.

In some cases, the techniques described herein include determining an optimal route for traversing an environment using a vehicle computing device and based on a road weight provided by a remote system (e.g., a fleet management system) to the vehicle computing device. As described above, in some cases, the vehicle computing device may determine the optimal route for traversing an environment from a starting location (e.g., a rider pick-up location) and/or to a requested destination location. In some cases, the vehicle computing device may use a graph of the vehicle's environment in which roads represent edges and road weights represent edge weights. In some cases, to determine the optimal route, the vehicle computing device may perform a graph processing operation on this graph. This graph processing operation may use a graph search algorithm like Dijkstra's algorithm to find the shortest path through the graph from the starting location to destination location based on the edge weights.

In some cases, the techniques described herein enable the remote system to further optimize transmission efficiency and traffic distribution through selective transmission of updated weights. For example, the remote system may only transmit an updated weight to a vehicle computing device if it deviates from the prior weight by a threshold amount, to reduce unnecessary data transfer.

In some cases, the remote system may perturb the weights using randomized magnitudes before sending them to different vehicles. This may create diversity in the route planning, prevent road congestion, and/or ensure fleet vehicles are evenly distributed across the road network. The perturbed magnitudes may be randomly generated or determined based on current fleet distribution across a road network (e.g., to balance fleet presence across different roads on the network). Accordingly, the remote system may efficiently manage the fleet and road utilization through strategic weight adjustment and/or transmission.

In some cases, the techniques described herein enable improved transmission efficiency between the remote system and the vehicle computing devices. Rather than transmitting large amounts of raw data like traffic data, road status data, and/or fleet density data to each vehicle, the remote system pre-processes this data into road weights and only transmits the road weights. This greatly reduces the amount of data that needs to be sent to each vehicle. For example, the remote system may initially send a set of weights for relevant roads and then only selectively send updates when a weight is determined to change, avoiding resending weights that have not changed.

In some cases, the techniques described herein enable reducing the computational load on the vehicle computing devices. Since the remote system pre-processes the raw data into road weights, the vehicle computing device may use these weights directly for route planning without having to process large amounts of data. This allows the route planning calculations to be simplified to graph search algorithms based on the provided edge weights. Offloading the raw data processing to the remote system saves significant computation that would otherwise have to occur using the vehicle computing devices. This is important given the limited hardware resources on most vehicle computing devices compared to the remote system. The reduced computational load also enables faster route planning using the vehicle computing device.

In some cases, the techniques described herein enable efficiently controlling a fleet system centrally through the remote system. For example, the remote system may adjust how it computes road weights to balance traffic across roads or create fleet diversity. The remote system may also selectively determine which updated weights to transmit to each vehicle to further optimize transmission efficiency. This centralized control allows fleet-wide optimization.

The techniques described herein may be implemented in a number of ways. Example implementations are provided below with reference to the following figures. Example implementations are discussed below in which the delivery vehicles are implemented as autonomous vehicles. However, the methods, apparatuses, and systems described herein may be applied to fully or partially autonomous delivery vehicles, robots, and/or robotic systems and are not limited to autonomous vehicles. Moreover, at least some of the techniques described herein may be utilized with driver-controlled vehicles. While various techniques described herein relate to determining an optimal route by a vehicle computing device of a vehicle that is part of a fleet, a person of ordinary skill in the relevant technology will recognize that the techniques described herein may be used by a vehicle computing device associated with a vehicle that is not part of a fleet.

FIG. 1 depicts an example environment 100 that may be used for routing a fleet of vehicles to perform various driving trips in an environment. As shown in this example, fleet management system 102 may receive driving trip requests and may determine road weight data 122 to provide to individual vehicles 104-108 in the fleet that will perform the requested driving trips. In this example, the environment 100 may include a first vehicle 104, a second vehicle 106, and a third vehicle 108, each of which may be instructed via separate sets of road weight data 122 provided by the fleet management system 102 to perform specific driving trips. The vehicles 104-108 may be autonomous vehicles, semi-autonomous vehicles, and/or driver-controlled vehicles. In some cases, the vehicles 104-108 may be autonomous vehicles configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, vehicles 104-108 may be fully or partially autonomous vehicles having any other level or classification. As noted above, vehicles 104-108 may be associated with a ride-hailing service (e.g., taxi service) vehicles, and/or may be delivery service vehicles. Ride-hailing service vehicles may operate within the example environment 100 to provide transportation to passengers from a starting location to a destination. Delivery service vehicles may operate within the example environment 100 to deliver items to various delivery locations.

Within the example environment 100, the vehicles 104-108 may be managed by the fleet management system 102. In some examples, the fleet management system 102 may be implemented as a component integrated as a separate server-based system, such as a system operating in a cloud computing environment. As noted above, the fleet management system 102 may transmit, via one or more networks, road weight data 122 that includes weights associated with roads. Additionally, in some examples, the vehicles 104-108 also may transmit various data back to the fleet management system 102, including but not limited to location data, sensor data captured by the sensors of the vehicles 104-108, and/or the complete driving routes determined by the route planning components of the vehicles 104-108.

In various examples, the fleet management system 102 may deploy and manage any number of vehicles including, but not limited to, coordinating pick-up and drop-off requests from future passengers, providing location data for provisioning of services or delivery of goods, providing suggested routes to individual vehicles in the fleet, etc. In some examples, the fleet management system 102 may dynamically control vehicle activities by transitioning the vehicles from taxi service vehicles to delivery service vehicles and/or delivery service vehicles to taxi service vehicles. In various examples, the fleet management system 102 may manage an entire fleet of vehicles covering an entire driving environment or may manage only a subset of vehicles within a specified portion of the environment.

As depicted in FIG. 1, fleet management system 102 may include various components configured to perform different functionalities of the vehicle routing techniques described herein. For instance, the fleet management system 102 may include a processor 110 and a memory 112. Memory 112 may store, and the processor 110 may execute, operations corresponding a traffic aggregator 114, a routing aggregator 116, and a remote route planner 118. Memory 112 may further store historical traffic data 120.

Traffic aggregator 114 may be configured to determine a traffic estimate (e.g., a measure of estimated traffic) for a road. To determine traffic estimate(s), traffic aggregator 114 may use historical traffic data 120, real-time traffic data, fleet density data, and/or sensor data provided by the sensor(s) 124 and/or the perception component 126 of the vehicles 104-108. Traffic aggregator 114 may provide traffic estimate(s) to the routing aggregator 116.

Routing aggregator 116 may be configured to determine road weight data 122 (e.g., one or more weights for one or more roads) based on the traffic estimate(s) provided by traffic aggregator 114 and/or road status data, such as road status data provided by a map system and/or a road network system. Routing aggregator 116 may be configured to provide road weight data 122 to at least one of remote route planner 118 or to one or more of the vehicles 104-108 (e.g., to a mission master component of a vehicle).

Remote route planner 118 may be configured to determine an optimal route for reaching a requested destination location and/or an ETA associated with the optimal route. In some cases, remote route planner 118 is executed as an encapsulated software unit (e.g., using a wrapper function and/or a wrapper class). In some cases, remote route planner 118 is executed by a cloud management system associated with the fleet management system 102.

In some cases, after requesting a request to travel to a destination location using a fleet of vehicles, the fleet management system 102 allocates a vehicle to the request. In some cases, the routing aggregator 116 then computes a set of road weights for a set of roads associated with a region that relates to the request. The routing aggregator 116 may then provide this road weight data 122 to at least one of remote route planner 118 and the local route planner 130.

Remote route planner 118 may use the road weight data 122 to determine an optimal route for reaching the requested destination location and/or an ETA associated with the optimal route. Remote route planner 118 may provide the optimal route and/or the ETA to the vehicle 104-108, which may provide data associated with the optimal route and/or the ETA using the vehicle display 134 before an optimal route and/or an ETA determined by the vehicle 104-108 itself is available. In some cases, vehicle 104-108 uses the optimal route and/or the ETA determined by remote route planner 118 to perform decision planning operations until an optimal route and/or an ETA determined by the vehicle 104 itself is available. In some cases, the fleet management system 102 transmits the optimal route and/or the ETA determined by remote route planner 118 to a user device (e.g., a smartphone device), for example for display using a software application executing on the user device.

In some cases, the fleet management system 102 computes a set of road weights for the entire region associated with the mapping data available to the fleet management system 102 (e.g., for the whole map). In some cases, the fleet management system 102 computes a set of road weights for a region determined based on at least one of a predefined radius around the vehicle location, a predefined radius around a passenger pickup location, or a predefined radius around a destination location. In some cases, the fleet management system 102 transmits all of the computed weights (e.g., all of the weights associated with the entire region associated with the mapping data available to the fleet management system 102) to the vehicle 104. In some cases, the fleet management system 102 transmits a subset of the computed weights (e.g., a subset associated with a region determined based on at least one of a predefined radius around the vehicle location, a predefined radius around a passenger pickup location, or a predefined radius around a destination location) to the vehicle 104.

In some cases, the optimal route and/or ETA generated by the remote route planner 118 may be different from the optimal route and/or ETA generated by the local route planner 130. In some cases, the ride engine 128 displays the optimal route and/or the ETA generated by the remote route planner 118 on the vehicle display 134 before the optimal route and/or the ETA generated by the local route planner 130 is generated. In some cases, after the local route planner 130 generates an optimal route and/or an ETA, the generated optimal route and/or ETA is displayed on the vehicle display 134. In some cases, the ride engine 128 provides the optimal route and/or the ETA generated by the local route planner 130 to the fleet management engine 210. In some cases, before receiving the optimal route and/or the ETA generated by the local route planner 130, the fleet management engine 210 provides the optimal route and/or the ETA generated by the remote route planner 118 to the user device 208. In some cases, after receiving the optimal route and/or the ETA generated by the local route planner 130, the fleet management engine 210 provides the optimal route and/or the ETA generated by the local route planner 130 to the user device 208. In some cases, after generating the optimal route and/or the ETA generated by the local route planner 130, the local route planner 130 only provides the generated route and/or ETA to the fleet management engine 210 only if the generated route and/or ETA is different from the optimal route and/or ETA generated by the fleet management engine 210. In some cases, after generating the optimal route and/or the ETA generated by the local route planner 130, the local route planner 130 only provides the generated route and/or ETA to the fleet management engine 210.

In the example environment 100 of FIG. 1, each of the vehicles 104-108 (as well as other vehicles in the fleet), may be configured to determine optimal routes and driving trajectories, including specific trajectories and turn-by-turn driving routes for the vehicle to perform the requested driving trip, based on the road weight data 122 provided by the fleet management system 102. As shown in this example, the vehicles 104-108 in the fleet may include various components configured to determine complete driving routes, including sensors 124, a perception component 126, a ride engine 128, a local route planner 130, a decision planner 132, and a vehicle display 134.

Sensors 124 may include, for example, image sensors (e.g., cameras), lidar sensors, radar sensors, time-of-light sensors, environmental sensors, audio sensors, inertial sensors, sonar sensors, location sensors (e.g., a global positioning system (GPS)), and various other sensors configured to capture data representing the external environment around the vehicle 104. The perception component 126 may be configured to use sensor data from the sensors 124 (and/or additional data) to detect and classify objects in the environment surrounding the vehicle 104. The decision planner 132 may be configured to determine driving trajectories for controlling the vehicle 104 based on output of the perception component 126 and/or based on optimal routes determined by the local route planner 130.

Ride engine 128 may be configured to receive a task from the fleet management system 102 to pick up a rider from a starting location and/or to take the rider to a requested destination location. Ride engine 128 may further be configured to initiate execution of a task received from the fleet management system 102 (e.g., by providing the task to a mission master component of vehicle 104). Ride engine 128 may further be configured to interact with the rider during pickup and/or during the ride. For example, ride engine 128 may be configured to open the door of vehicle 104 for the rider during pickup. In some cases, ride engine 128 is configured to display data on vehicle display 134. For example, ride engine 128 may be configured to receive optimal route data and/or ETA data determined by the remote route planner 118 and display such received data on vehicle display 134.

Local route planner 130 may be configured to determine an optimal route for reaching a requested destination and/or an ETA associated with that route based on the road weight data 122 provided by the fleet management system 102. In some cases, local route planner 130 is executed as an encapsulated software unit (e.g., using a wrapper function and/or a wrapper class). The encapsulated software unit may have the same codebase and/or the same operational logic as the encapsulated software unit associated with remote route planner 118. Local route planner 130 may provide the optimal route and/or the ETA to the ride engine 128, which may provide data associated with the optimal route and/or the ETA using the vehicle display 134.

Figure 2:
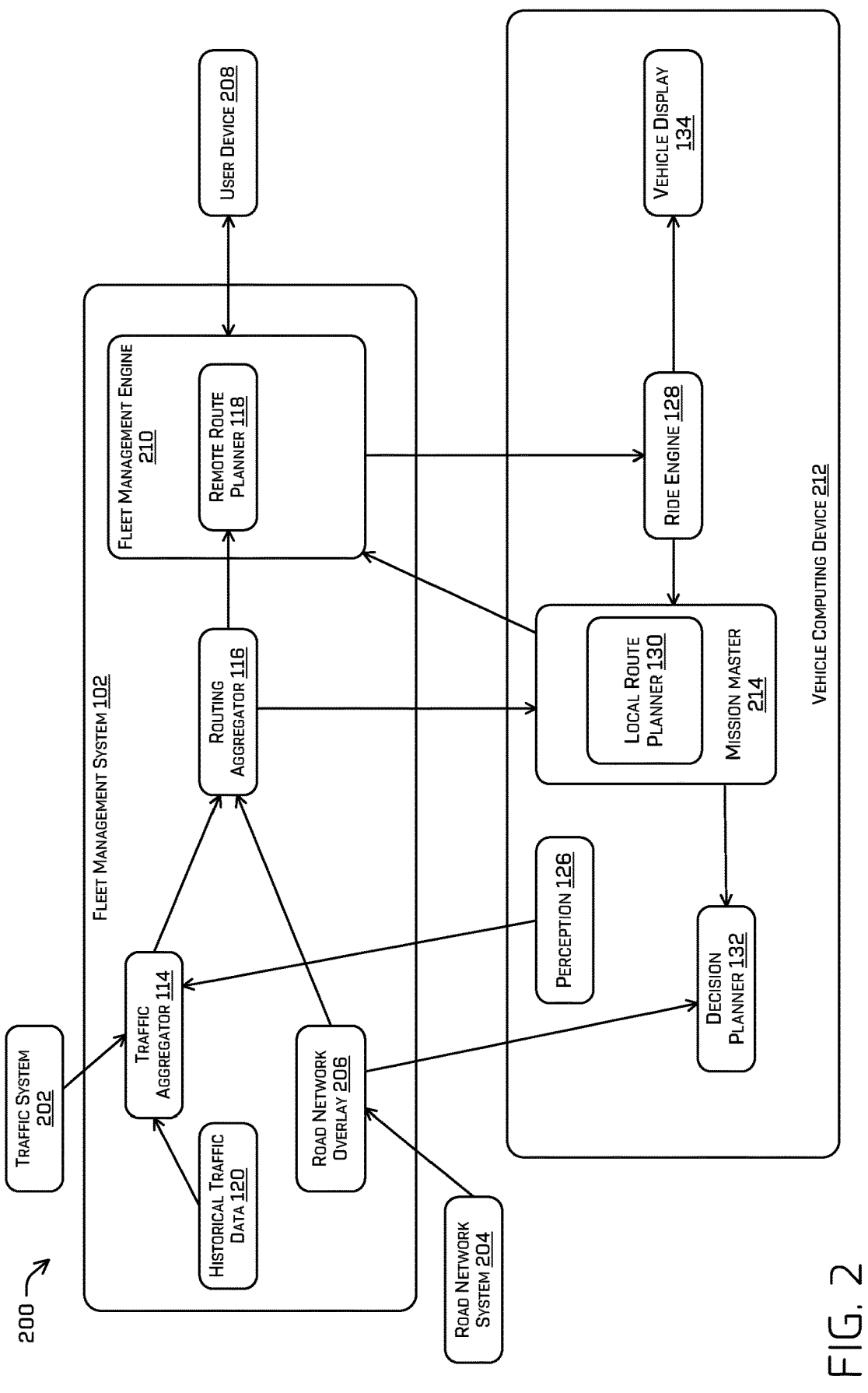
FIG. 2 provides a data flow diagram of an example architecture for routing a fleet of vehicles to perform various driving trips in an environment.

FIG. 2 provides a data flow diagram of an example architecture 200 for routing a fleet of vehicles to perform various driving trips in an environment. As depicted in FIG. 2, the traffic aggregator 114 uses historical traffic data 120, real-time traffic data provided by a traffic system 202, and object detection data provided by the perception component 126 to determine a traffic estimate for a road (e.g., a set of traffic estimates for a set of roads) and provide the traffic estimate(s) to the routing aggregator 116. Of course such examples are provided for illustrative purposes and the disclosure is not meant to be so limiting as additional sources are contemplated. Additionally, a road network system 204 (e.g., a mapping system) may be configured to provide road status data to a road network overlay 206. Road network overlay 206 may be configured to determine one or more road status alerts based on the road status data provided by the road network system 204.

As further depicted in FIG. 2, the routing aggregator 116 uses the traffic estimate(s) generated by the routing aggregator 116 and the road status alerts generated by the road network overlay 206 to determine road weights for a set of roads and providing the determined weights to vehicle computing devices operating on fleet vehicles and to the remote route planner 118. A road may be any segment of a pathway (e.g., a fixed distance along a lane, a portion of a lane of a fixed length, a portion of a lane having a same or similar geometric feature, etc.) and may in some cases not correspond to addressing designations of pathways. In some cases, the routing aggregator 116 generates the same road weights in relation to all vehicles, while in other cases the routing aggregator 116 generates different road weights in relation to different vehicles and to different corresponding vehicle computing devices. For example, the different weights provided to different vehicle computing devices may be provided by adjusting (e.g., randomly adjusting) a generated weight. The objective behind this differential weighting is to enhance fleet diversity. Routing aggregator 116 provides generated road weights to both the remote route planner 118 and the local route planner 130.

As further depicted in FIG. 2, remote route planner 118 receives the road weights generated by the routing aggregator 116 and uses such road weights to generate an optimal route and a corresponding ETA. Remote route planner 118 may operate as a wrapper function by a fleet management engine 210, which may be a cloud management system. After remote route planner 118 generates the road weights, those road weights are displayed to a user using a user device 208 (e.g., a smartphone device) and provided to a ride engine 128 of a vehicle computing device 212. Ride engine 128 may display data associated with the optimal route and the corresponding ETA using the vehicle display 134 before the local route planner 130 generates an optimal route and a corresponding ETA based on the road weights generated by the routing aggregator 116.

As further depicted in FIG. 2, remote route planner 118 receives a ride request from the user device 208, determines which vehicle of a fleet of vehicles to assign the request, and provides the ride request to the ride engine 128 of a vehicle that is assigned to the ride request. The ride engine 128 then provides the ride request to the local route planner 130 to generate the optimal route and the corresponding ETA based on the road weights generated by the routing aggregator 116. The local route planner 130 may operate as a wrapper function by a mission master 214. After the local route planner 130 generates the optimal route and the corresponding ETA, the optimal route and corresponding ETA are provided to the fleet management engine 210 to update the data provided to the user via user device 208. In some cases, as the local route planner 130 generates new optimal routes and ETAs during the ride, such new data is provided to the fleet management engine 210 as well. Local route planner 130 also provides the optimal route to the decision planner 132, which generates a trajectory for the vehicle based on the optimal route. For example, in response to a ride request for a ride to destination 136, local route planner 130 may generate optimal route 138 and provide the optimal route to decision planner 132 for trajectory planning.

As further depicted in FIG. 2, decision planner 132 determines the trajectory for the vehicle based on the optimal route generated by the local route planner 130 and road status alerts generated by the road network overlay 206. In some cases, road network overlay 206 generates at least two types of road status alerts: routing-related road status alerts that affect route planning and non-routing-related road status alerts that do not affect route planning. Examples of routing-related road status alerts include road closure alerts and lane closure alerts. Examples of non-routing-related road status alerts include alerts that affect a vehicle's driving trajectory but do not affect the route planning for the vehicle, such as alerts about required oversight on roads, alerts about the need to avoid parking in particular spots, and alerts about high pedestrian concentration in particular areas. In some cases, road network overlay 206 provides routing-related road status alerts to routing aggregator 116 which uses such alerts to generate road weights. In some cases, road network overlay 206 provides non-routing-related road status alerts to the decision planner 132 which uses such data to generate a trajectory for the vehicle.

Figure 3:
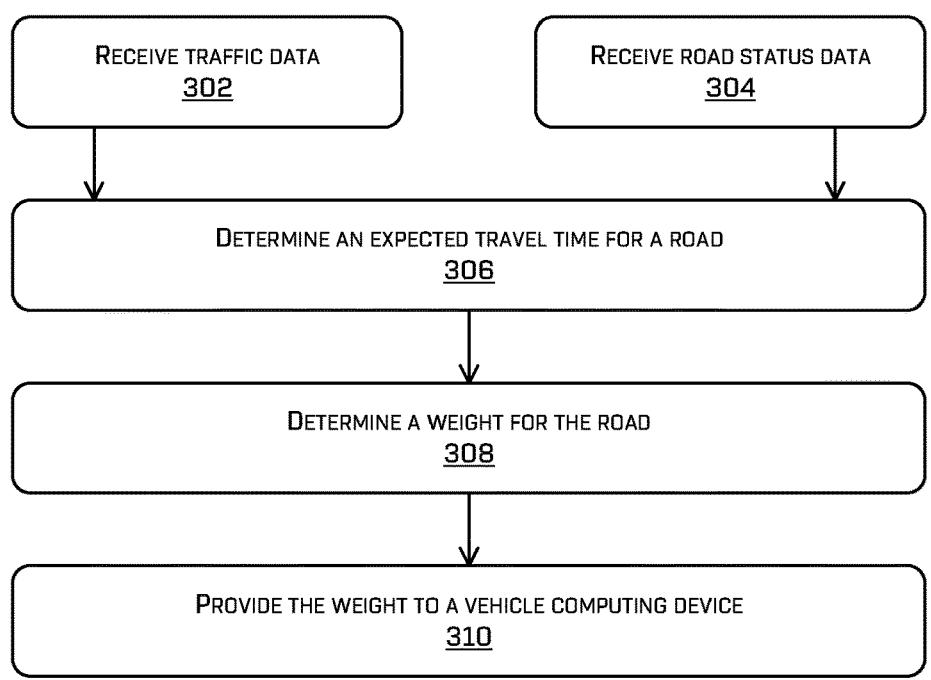
FIG. 3 is a flowchart diagram of an example process for determining a road's weight using a computer system that is remote from a vehicle computing device, such as a fleet management system.

FIG. 3 is a flowchart diagram of an example process 300 for determining a road's weight using a computer system that is remote from a vehicle computing device, such as a fleet management system. In some cases, process 300 causes road weights to be determined centrally. The weights may then be transmitted to vehicles to reduce computational complexity of on-vehicle route planning. In some cases, periodically repeating the process 300 allows the weights to stay updated based on changing conditions.

At operation 302, process 300 includes receiving traffic data associated with a road. The traffic data may include historical traffic data as well as real-time traffic data. The historical traffic data may indicate expected travel times on roads based on time of day, day of week, and/or the like. The real-time traffic data may indicate current speeds and congestion levels on roads.

At operation 304, process 300 includes receiving road status data associated with the road. The road status data may indicate one or more temporary changes to the road like closures, detours, accidents, and/or the like.

At operation 306, process 300 includes determining expected travel time for the road based on the traffic data and the road status data. In some cases, operation 306 includes adjusting historical travel times based on any real-time travel conditions and/or road status alerts. For example, a road may historically take 20 minutes during rush hour. But if real-time data shows an accident, the expected travel time may be increased to 30 minutes.

At operation 308, process 300 includes determining a weight for the road based on the expected travel time for the road. In some cases, a road's weight is proportional to the expected travel time, so that a road with a higher expected time has a lower weight and vice vera.

At operation 310, process 300 includes providing the calculated weight for a road to a vehicle computing device. In some cases, instead of sending input data used to compute road weights (e.g., traffic data, road status data, and/or fleet density data) to a vehicle computing device, the remote system transmits road weights.

Figure 4:
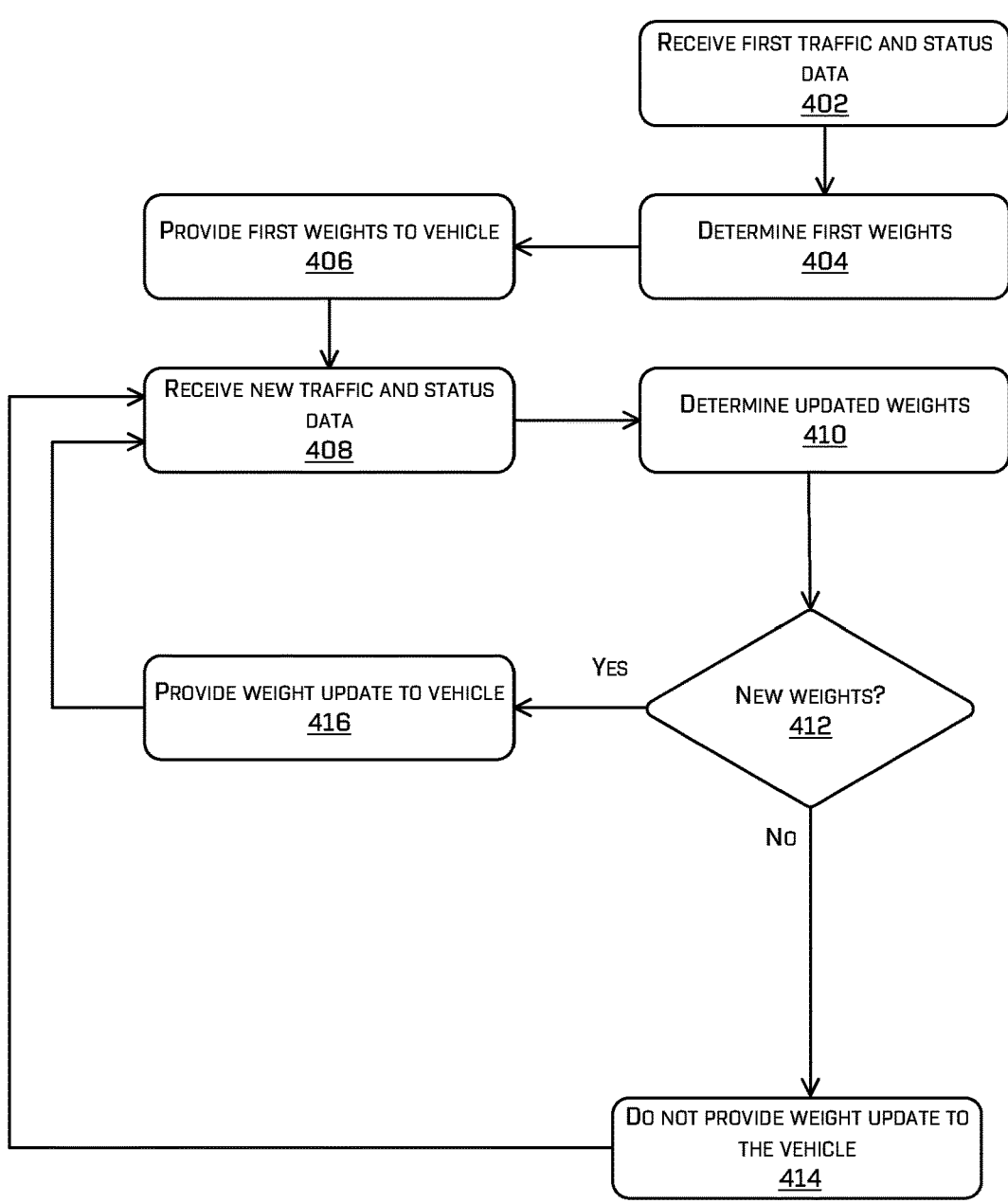
FIG. 4 is a flowchart diagram of an example process for managing a ride request using a fleet management system.

FIG. 4 is a flowchart diagram of an example process 400 for managing a ride request using a fleet management system. As depicted in FIG. 4, at operation 402, In some cases, in addition to or instead of the weight(s), a set of transition probabilities are generated and provided to the vehicle computing device. A transition probability may represent a probability (e.g., ease, safety, and/or like) of transitioning from one lane of a road to another lane of the road. process 400 includes receiving first traffic data and first road status data associated with a first time. The first traffic data and the first road status data may reflect current traffic and road status data associated with a current time, such as a time at which a ride was requested and/or a time at which a ride begins.

At operation 404, process 400 includes determining a first set of road weights based on the first traffic data and the first road status data. The first set of road weights may be determined based on expected travel times that are computed based on the first traffic data and the first road status data.

At operation 406, process 400 includes providing the first set of road weights to the assigned vehicle's computing device. In some cases, the first set of road weights are transmitted to the vehicle computing device to enable the vehicle computing device to begin route planning using the first set of road weights.

At operation 408, process 400 includes receiving new traffic data and new road status data associated with a second time. This new data may reflect any changes in road conditions since the original ride request time.

At operation 410, process 400 includes determining an updated set of weights based on the new traffic data and the new road status data. In some cases, a fleet management system recalculates the road weights to determine an updated set of weights. These new weights may reflect the changed road conditions.

At operation 412, process 400 includes determining whether the updated set of weights include a weight that is not previously transmitted (e.g., a weight for a new road or a modified weight for a road for which a weight was previously provided). For example, process 400 may determine that the updated set of weights include a weight that is not previously transmitted if new weights for roads along an updated optimal route are generated, or weights for existing roads have changed. In some cases, a modified weight for an existing road is only reported if the change in the weight exceeds a threshold.

If there are no new or significantly changed weights, the process 400 skips transmission of updated weight data at operation 414 and loops back to operation 408 to await further data updates. If there are new or changed weights detected at operation 414, then at operation 416, the process 400 transmits these new weights to the vehicle. This may enable the vehicle to incorporate the updated weights into its ongoing route planning. After either operation 414 or 416, the process 400 returns to operation 408 to continue receiving new traffic and road status data, recalculating weights, and selectively transmitting weight updates to the vehicle throughout the remainder of the ride. This allows the assigned vehicle's route planning to dynamically adapt to changing conditions during the trip.

Figure 5:
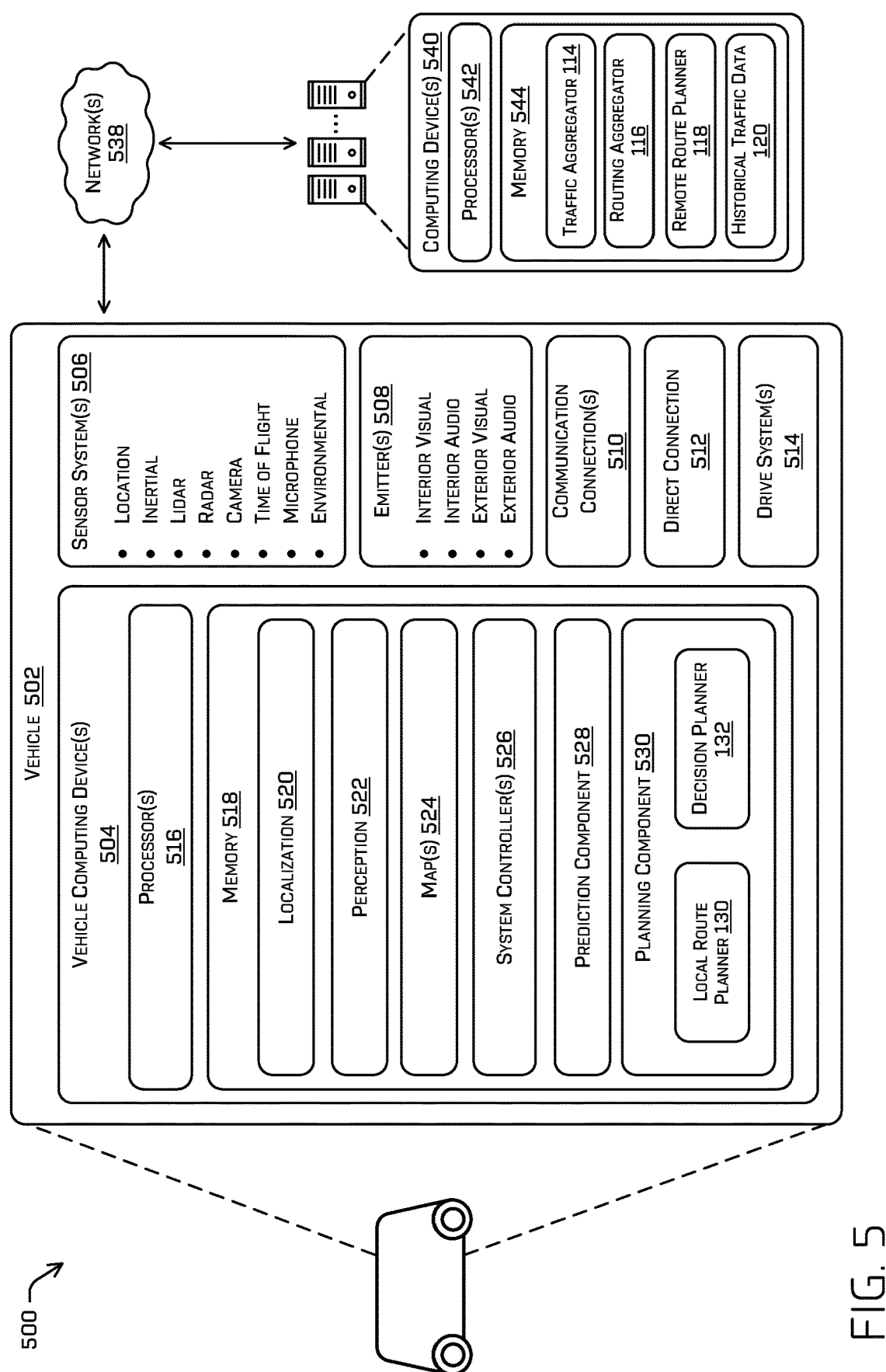
FIG. 5 depicts a block diagram of an example system for implementing various techniques described herein.

FIG. 5 depicts a block diagram of an example system 500 for implementing various techniques described herein. In some instances, the example system 500 may include vehicle 502, which may represent the vehicle 104 discussed above in FIGS. 1-4, and one or more computing devices 540, which may represent the fleet management system 102 discussed above. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification.

Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

Vehicle 502 may be configured to perform various techniques described herein, including receiving road weight data 122 from the computing device(s) 540 based on requested driving trips, and determining driving routes based on road weight data 122. Similarly, the computing device(s) 540 may be configured to perform various techniques of the fleet management system 102 described herein, including modifying route data for vehicles in a fleet, based on the current and/or previous driving trips performed by the fleet.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. In this example, vehicle 502 may correspond to vehicle 104 discussed above. The system 500 may additionally or alternatively comprise vehicle computing device(s) 504.

In some instances, the sensor(s) 506 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 540.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, and/or the like), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive systems(s) 514. Also, the network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 540. In some examples, computing device(s) 540 may comprise one or more nodes of a distributed computing system (e.g., a cloud computing architecture).

The network interface(s) 510 may include physical and/or logical interfaces for connecting the vehicle computing device(s) 504 to another computing device or a network, such as network(s) 538. For example, the network interface(s) 510 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor(s) 506 may send sensor data, via the network(s) 538, to the computing device(s) 540 at a particular frequency, after a lapse of a predetermined period, in near real-time, etc.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 514. In some cases, the sensor(s) on the drive system(s) 514 may overlap or supplement corresponding systems of the vehicle 502 (e.g., sensor(s) 506).

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 514 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive system(s) 514. Furthermore, the drive systems(s) 514 may also include one or more communication connection(s) that enable communication by the respective drive component with one or more other local or remote computing device(s).

The vehicle computing device(s) 504 may include processor(s) 516 and memory 518 communicatively coupled with the one or more processors 516. Memory 518 may represent memory 112 of a fleet management system 102. Computing device(s) 540 may also include processor(s) 542, and/or memory 544. As described above, the memory 544 of the computing device(s) 540, which may be implemented as a fleet management system 102, may store and execute a traffic aggregator 114, a routing aggregator 116, and a remote route planner 118, configured to perform any combination of functionalities of the fleet management system 102 described herein. The memory 544 may also store historical traffic data 120.

The processor(s) 516 and/or 542 may be any suitable processor capable of executing instructions to process data and perform operations as described herein. By way of example and not limitation, the processor(s) 516 and/or 542 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 544 may be examples of non-transitory computer-readable media. Memory 518 and/or 544 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein May include many other logical, programmatic, and physical components, of which those shown in the accompanying figures are merely examples that are related to the discussion herein.

In some instances, memory 518 and/or memory 544 may store a localization component 520, perception component 522, maps 524, system controller(s) 526, prediction component 528, and/or planning component 530.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include map(s) of an environment and may continuously determine a location, velocity, and/or orientation of the autonomous vehicle within the map(s). In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the planning component 530 and/or to the prediction component 528, a location and/or orientation of the vehicle 502 relative to the environment and/or sensor data associated therewith.

Memory 518 may further include one or more maps 524 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map may include a three-dimensional mesh generated using the techniques discussed herein. In some instances, the map may be stored in a tiled format, such that individual tiles of the map represent a discrete portion of an environment and may be loaded into working memory as needed. In at least one example, the one or more maps 524 may include at least one map (e.g., images and/or a mesh) generated in accordance with the techniques discussed herein. In some examples, the vehicle 502 may be controlled based at least in part on the maps 524. That is, the maps 524 may be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. The perception component 522 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 522 may be referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

Prediction component 528 may include functionality to generate predicted information associated with objects in an environment. As an example, the prediction component 528 may be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein may be implemented to predict locations of other objects (e.g., vehicles, bicycles, pedestrians, and the like) as vehicle 502 traverses an environment. In some examples, the prediction component 528 may generate one or more predicted positions, predicted velocities, predicted trajectories, etc., for such target objects based on attributes of the target object and/or other objects proximate the target object.

The planning component 530 may receive a location and/or orientation of the vehicle 502 from the localization component 520, perception data from the perception component 522, and/or predicted trajectories from the prediction component 528 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 526 and/or drive systems(s) 514 may parse/cause to be carried out, second instructions for the emitter(s) 508 may be formatted according to a second format associated therewith). In at least one example, the planning component 530 may comprise a nominal trajectory generation subcomponent that generates a set of candidate trajectories, and selects a trajectory for implementation by the drive systems(s) 514 based at least in part on determining a cost associated with a trajectory according to U.S. patent application Ser. No. 16/517,506, filed Jul. 19, 2019 and/or U.S. patent application Ser. No. 16/852,284, filed May 11, 2020, the entirety of which are incorporated herein for all purposes.

Memory 518 and/or 544 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 544 or configured as part of computing device(s) 540.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all the above ML models may comprise an attention mechanism, GNN, and/or any other neural network. An exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 540 may communicate (e.g., transmit and/or receive messages over network(s) 538) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving data associated with a road network, wherein the data comprises real-time traffic data associated with a first road in the road network and road status data associated with a second road in the road network; determining, based on the data, a plurality of weights comprising a first weight associated with the first road and a second weight associated with the second road; and transmitting the plurality of weights to a vehicle computing device associated with an autonomous vehicle remote from the system, wherein the vehicle computing device is configured to compute a route for traversing the road network based on the plurality of weights.

B: The system of paragraph A, wherein: the data further comprises real-time vehicle density data associated with the first road, and the real-time vehicle density data is determined based on at least one of location data or sensor data received from a second vehicle computing associated with a second autonomous vehicle.

C: The system of paragraph A or B, wherein determining the first weight comprises: determining, based on the data, an expected travel time associated with the first road; and determining the first weight based on the expected travel time.

D: The system of any of paragraphs A-C, wherein: the vehicle computing device is further configured to determine a first estimated time of arrival associated with the route, and the operations further comprise: computing a second route for traversing the road network based on the plurality of weights; determining a second estimated time of arrival for the second route; and transmitting the second estimated time of arrival to the vehicle computing device, wherein the vehicle computing device is configured to display the second estimated time of arrival.

E: The system of any of paragraphs A-D, wherein: the data further comprises road condition data associated with the first road comprising at least one of road surface quality data, vehicle density data, or weather data.

F: One or more non-transitory computer-readable media storing instructions executable by one or more processors, wherein the instructions, when executed, cause the one or more processors to perform operations comprising: receiving data associated with a first road; determining, based on the data, a first weight associated with the first road; transmitting the first weight to a vehicle computing device associated with a vehicle, wherein the vehicle computing device is configured to: determine a route for traversing a road network comprising the first road and an estimated time of arrival for the route based on the first weight; and at least one of: control the vehicle based on the route, or display the estimated time of arrival.

G: The one or more non-transitory computer-readable media of paragraph F, the operations further comprising: receiving status data associated with a second road; determining a second weight associated with the second road based on the status data; and providing the second weight to the vehicle computing device.

H: The one or more non-transitory computer-readable media of paragraph G, wherein the data comprises at least one of road surface quality data, fleet density data associated with a fleet comprising the vehicle, or weather data.

I: The one or more non-transitory computer-readable media of any of paragraphs F-H, the operations further comprising: receiving real-time vehicle density data associated with the first road, and determining the first weight based on the real-time vehicle density data.

J: The one or more non-transitory computer-readable media of paragraph I, wherein the real-time vehicle density data is determined based on at least one of location data or sensor data received from a sensor associated with a second vehicle.

K: The one or more non-transitory computer-readable media of any of paragraphs F-J, wherein: the data comprises real-time traffic data associated with the first road and historical traffic data associated with the first road, and determining the first weight comprises: determining an expected travel time determined based on the historical traffic data, and adjusting the expected travel time based on the real-time traffic data.

L: The one or more non-transitory computer-readable media of any of paragraphs F-K, wherein the operations further comprise: determining, based on the data, a transition probability associated with transitioning from a first lane associated with the first road to a second lane associated with the first road; and transmitting the transition probability to the vehicle computing device.

M: The one or more non-transitory computer-readable media of any of paragraphs F-L, the operations further comprising: computing a second route for traversing the road network and a second estimated time of arrival associated with the second route based on the first weight; and providing the second route and the second estimated time of arrival to the vehicle computing device, wherein the vehicle computing device is configured to generate display data based on the second route and the second estimated time of arrival.

N: The one or more non-transitory computer-readable media of any of paragraphs F-M, the operations further comprising: receiving update data representing a modification to the first road; determining, based at least in part on the update data, an updated first weight; and transmitting the updated first weight to the vehicle.

O: The one or more non-transitory computer-readable media of paragraph N, wherein transmitting the updated first weight to the vehicle is based on determining that the updated first weight deviates from the first weight by a threshold amount.

P: The one or more non-transitory computer-readable media of any of paragraphs F-O, wherein determining the first weight comprises: determining a second weight associated with the first road; and determining the first weight by perturbing the first weight by a first magnitude, wherein the first magnitude is randomly determined; wherein the operations further comprise: determining a third weight by perturbing the first weight by a second magnitude, wherein the second magnitude is randomly determined; and transmitting the third weight to a second vehicle computing device associated with a second vehicle.

Q: The one or more non-transitory computer-readable media of any of paragraphs F-P, wherein determining the first weight comprises: determining a second weight associated with the first road; and determining the first weight by perturbing the first weight by a first magnitude; wherein the operations further comprise: determining a third weight by perturbing the first weight by a second magnitude; and transmitting the third weight to a second vehicle computing device associated with a second vehicle, and wherein the first magnitude and the second magnitude are determined based on a distribution of a fleet comprising the vehicle and the second vehicle across a road network comprising the first road.

R: A method comprising: receiving data associated with a first road; determining, based on the data, a first weight associated with the first road; transmitting the first weight to a vehicle computing device associated with a vehicle, wherein the vehicle computing device is configured to: determine a route for traversing a road network comprising the first road and an estimated time of arrival for the route based on the first weight; and at least one of: control the vehicle based on the route, or display the estimated time of arrival.

S: The method of paragraph R, further comprising: receiving status data associated with a second road; determining a second weight associated with the second road based on the status data; and providing the second weight to the vehicle computing device.

T: The method of paragraph S, wherein: receiving condition data associated with the first road, wherein the condition data comprises at least one of road status data, road surface quality data, vehicle density data, or weather data; and determining the first weight based on the condition data.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All the methods and processes described above may be embodied in, and fully automated via, software code modules and/or computer-executable instructions executed by one or more computers or processors, hardware, or some combination thereof. Some or all the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
   receiving data associated with a road network, wherein the data associated with the road network comprises real-time traffic data associated with a first road in the road network and road status data associated with a second road in the road network;
   determining, based on the data associated with the road network, a plurality of weights comprising a first weight associated with the first road and a second weight associated with the second road, wherein determining the plurality of weights comprises:
      determining a third weight associated with the first road; and
      determining the first weight by perturbing the third weight by a first magnitude, the first magnitude being randomly determined; and
   transmitting the plurality of weights to a first vehicle computing device associated with a first autonomous vehicle remote from the system, wherein the first vehicle computing device is configured to compute a route for traversing the road network based on the plurality of weights, and to control the first autonomous vehicle based on the route;
   determining a fourth weight associated with the first road by perturbing the first weight by a second magnitude, wherein the second magnitude is randomly determined; and
   transmitting the fourth weight to a second vehicle computing device associated with a second autonomous vehicle.

2. The system of claim 1, wherein:
the data associated with the road network further comprises real-time vehicle density data associated with the first road, and
the real-time vehicle density data is determined based on at least one of location data or sensor data received from the second vehicle computing device associated with the second autonomous vehicle.

3. The system of claim 1, wherein determining the first weight further comprises:
determining, based on the data associated with the road network, an expected travel time associated with the first road; and
determining the first weight based on the expected travel time.

4. The system of claim 1, wherein:
the first vehicle computing device is further configured to determine a first estimated time of arrival associated with the route, and
the operations further comprise:
   computing a second route for traversing the road network based on the plurality of weights;
   determining a second estimated time of arrival for the second route; and
   transmitting the second estimated time of arrival to the first vehicle computing device, wherein the first vehicle computing device is configured to display the second estimated time of arrival.

5. The system of claim 1, wherein:

the data associated with the road network further comprises road condition data associated with the first road comprising at least one of road surface quality data, vehicle density data, or weather data.

6. One or more non-transitory computer-readable media storing instructions executable by one or more processors, wherein the instructions, when executed, cause the one or more processors to perform operations comprising:

receiving data associated with a first road;

determining, based on the data, a first weight associated with the first road, wherein determining the first weight comprises:

determining a second weight associated with the first road; and determining the first weight by perturbing the second weight by a first magnitude, wherein the first magnitude is randomly determined;

transmitting the first weight to a first vehicle computing device associated with a first vehicle, wherein the first vehicle computing device is configured to:

determine a route for traversing a road network comprising the first road and an estimated time of arrival for the route based on the first weight; and control the first vehicle based on the route;

determining a third weight by perturbing the first weight by a second magnitude, wherein the second magnitude is randomly determined; and transmitting the third weight to a second vehicle computing device associated with a second vehicle.

7. The one or more non-transitory computer-readable media of claim 6, the operations further comprising:

receiving status data associated with a second road;

determining a fourth weight associated with the second road based on the status data; and providing the fourth weight to the first vehicle computing device.

8. The one or more non-transitory computer-readable media of claim 7, wherein the data comprises at least one of road surface quality data, fleet density data associated with a fleet comprising the first vehicle, or weather data.

9. The one or more non-transitory computer-readable media of claim 6, the operations further comprising:

receiving real-time vehicle density data associated with the first road, wherein determining the first weight is based further on the real-time vehicle density data.

10. The one or more non-transitory computer-readable media of claim 9, wherein the real-time vehicle density data is determined based on at least one of location data or sensor data received from a sensor associated with the second vehicle.

11. The one or more non-transitory computer-readable media of claim 6, wherein:

the data comprises real-time traffic data associated with the first road and historical traffic data associated with the first road, and determining the first weight further comprises:

determining an expected travel time determined based on the historical traffic data, and adjusting the expected travel time based on the real-time traffic data.

12. The one or more non-transitory computer-readable media of claim 6, wherein the operations further comprise:

determining, based on the data, a transition probability associated with transitioning from a first lane associated with the first road to a second lane associated with the first road; and transmitting the transition probability to the first vehicle computing device.

13. The one or more non-transitory computer-readable media of claim 6, the operations further comprising:

computing a second route for traversing the road network and a second estimated time of arrival associated with the second route based on the first weight; and providing the second route and the second estimated time of arrival to the first vehicle computing device, wherein the first vehicle computing device is configured to generate display data based on the second route and the second estimated time of arrival.

14. The one or more non-transitory computer-readable media of claim 6, the operations further comprising:

receiving update data representing a modification to the first road;

determining, based at least in part on the update data, an updated first weight; and transmitting the updated first weight to the first vehicle.

15. The one or more non-transitory computer-readable media of claim 14, wherein transmitting the updated first weight to the first vehicle is based on determining that the updated first weight deviates from the first weight by a threshold amount.

16. The one or more non-transitory computer-readable media of claim 6, wherein the first magnitude and the second magnitude are determined based on a distribution of a fleet comprising the first vehicle and the second vehicle across the road network comprising the first road.

17. A method comprising:

receiving data associated with a first road;

determining, based on the data, a first weight associated with the first road, wherein determining the first weight comprises:

determining a second weight associated with the first road; and determining the first weight by perturbing the second weight by a first magnitude, wherein the first magnitude is randomly determined;

transmitting the first weight to a first vehicle computing device associated with a first vehicle, wherein the first vehicle computing device is configured to:

determine a route for traversing a road network comprising the first road and an estimated time of arrival for the route based on the first weight; and control the first vehicle based on the route;

determining a third weight by perturbing the first weight by a second magnitude, wherein the second magnitude is randomly determined; and transmitting the third weight to a second vehicle computing device associated with a second vehicle.

18. The method of claim 17, further comprising:

receiving status data associated with a second road;

determining a fourth weight associated with the second road based on the status data; and providing the fourth weight to the first vehicle computing device.

19. The method of claim 18, further comprising:

receiving condition data associated with the first road, wherein:

the condition data comprises at least one of road status data, road surface quality data, vehicle density data, or weather data; and determining the first weight is based further on the condition data.

* * * * *